Figure 18:
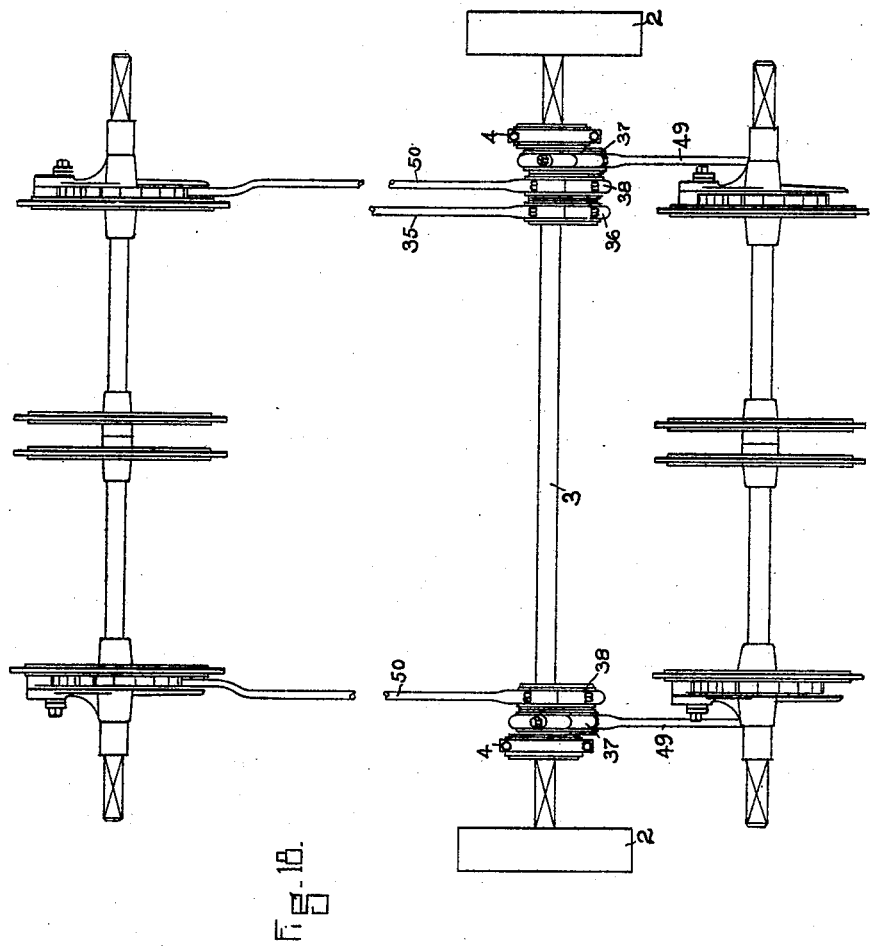

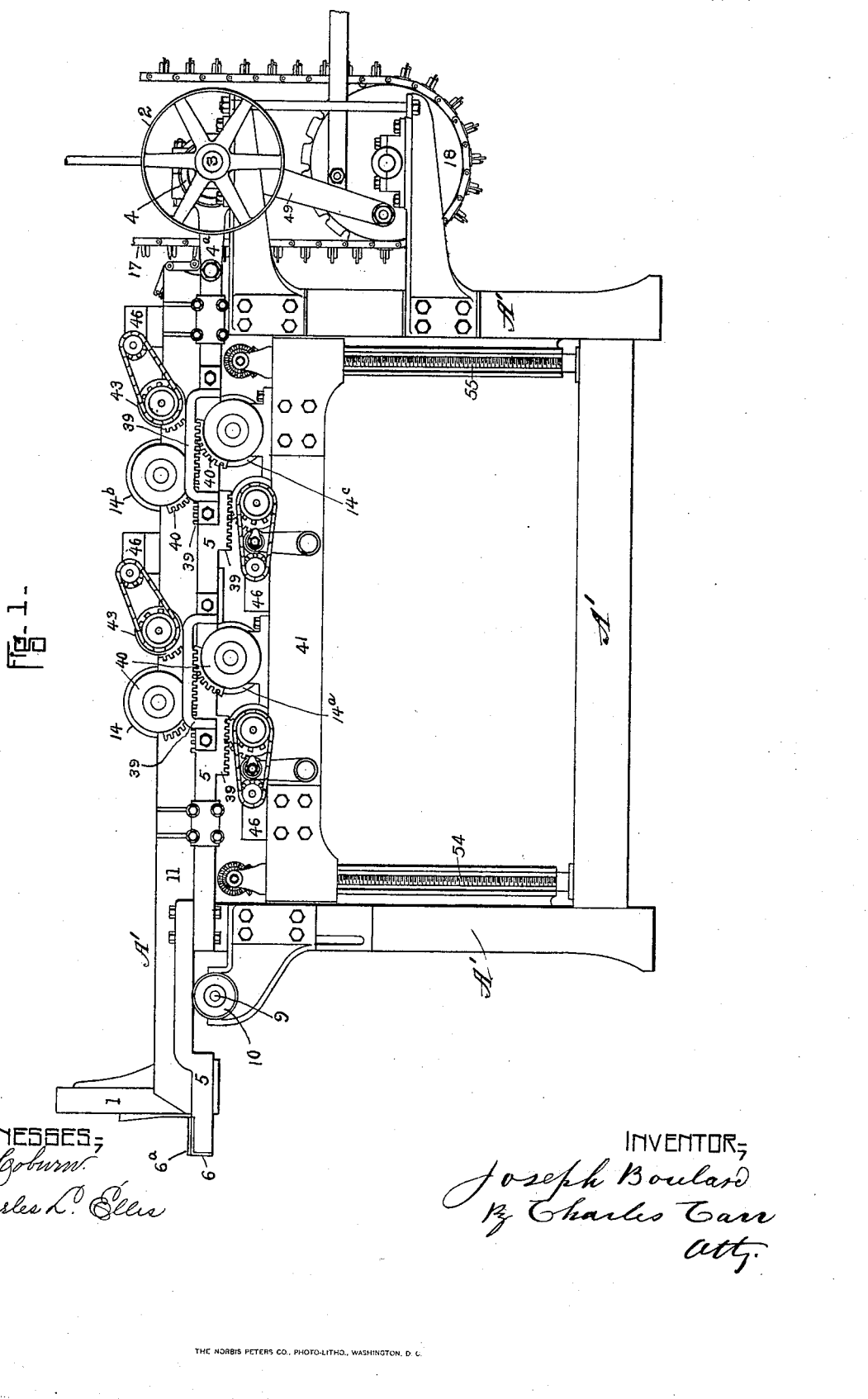

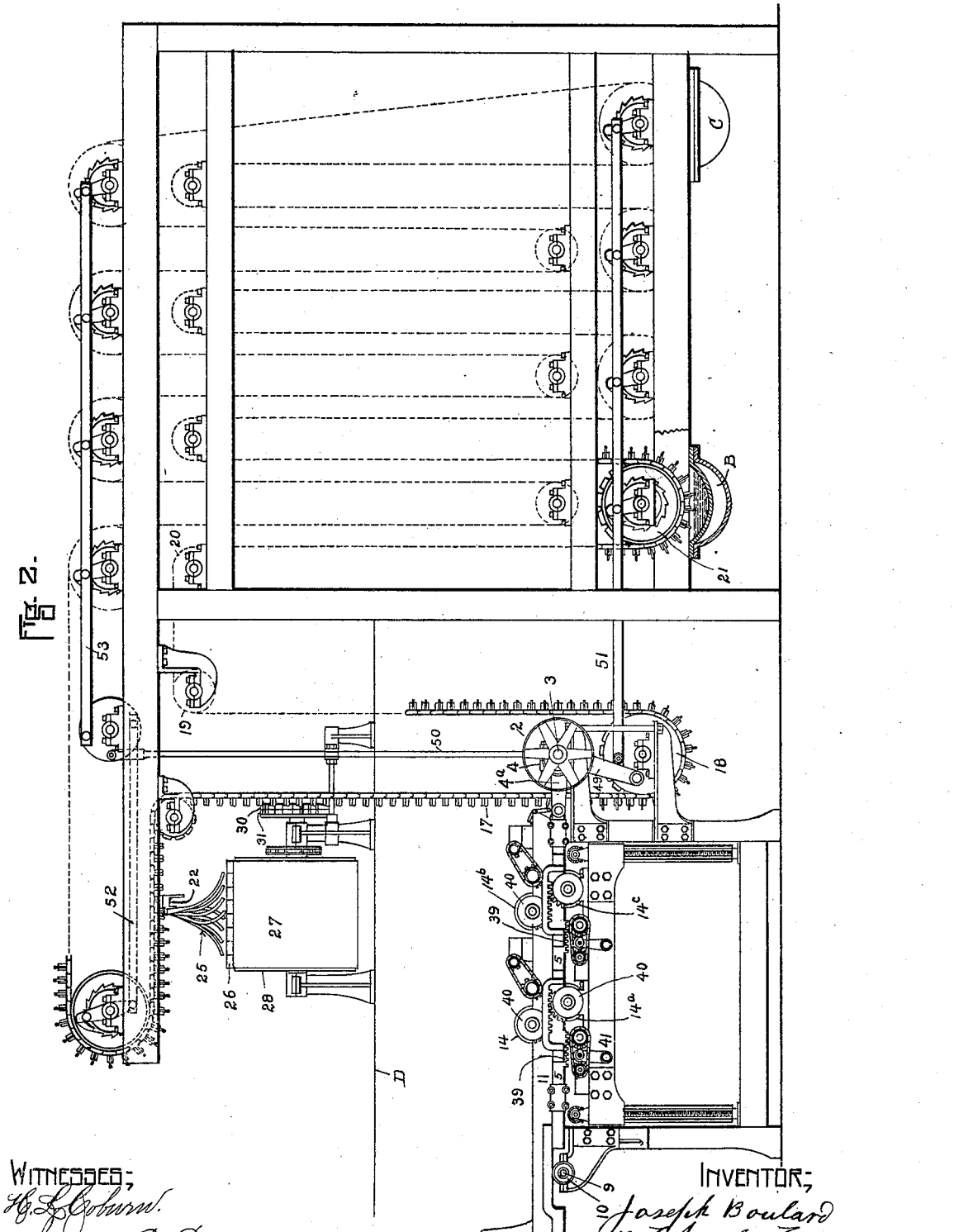

No. 614,925. Patented Nov. 29, 1898.
J. BOULARD.
MACHINE FOR MAKING MATCHES.
(Application filed May 14, 1896.)
(No Model.) 15 Sheets—Sheet 3.
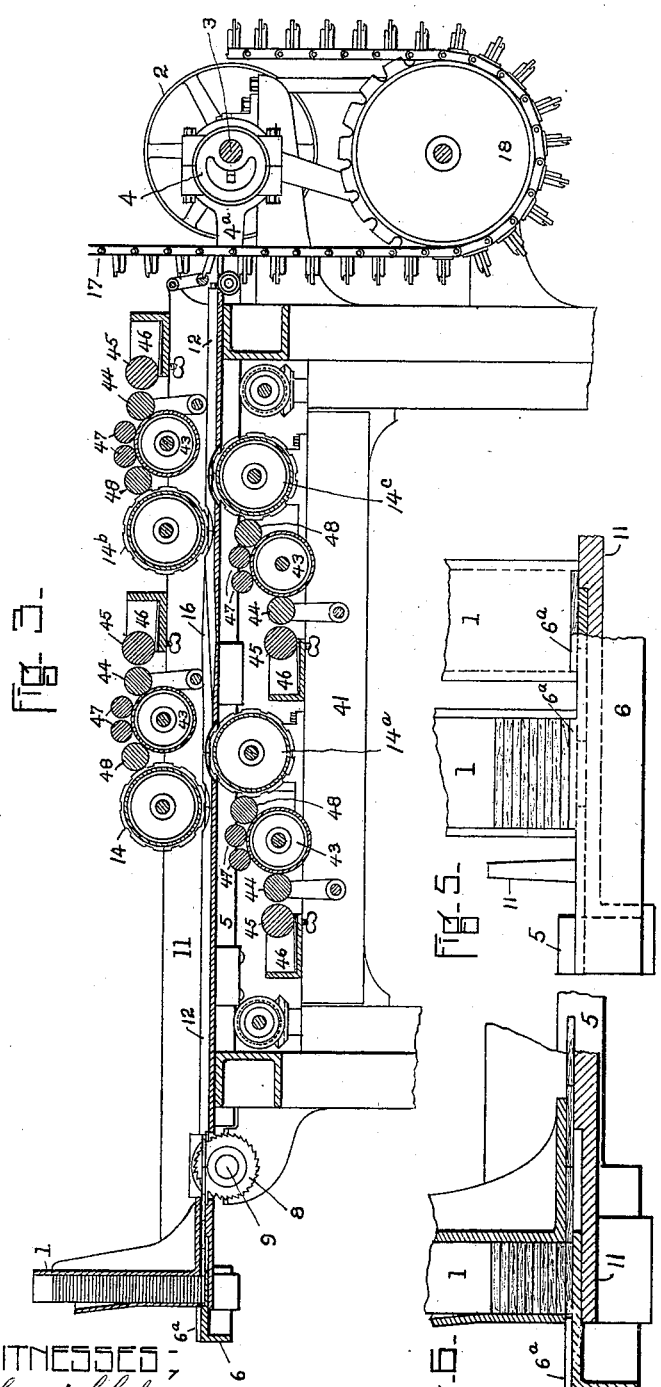
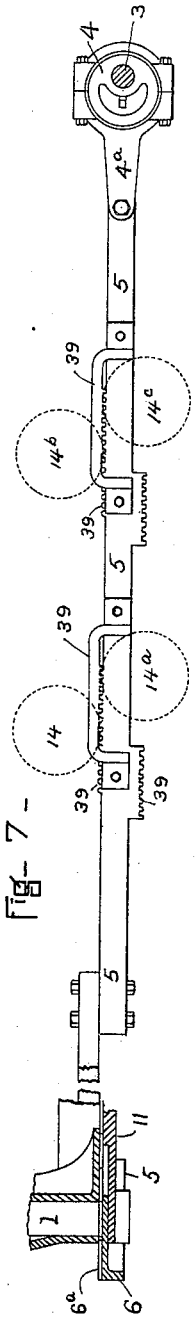
WITNESSES:
Howard S. Coburn
Charles L. Ellis
INVENTOR:
Joseph Boulard
By Charles Eau
atty.

No. 614,925. Patented Nov. 29, 1898.
J. BOULARD.
MACHINE FOR MAKING MATCHES.
(Application filed May 14, 1896.)
(No Model.) 15 Sheets—Sheet 4.
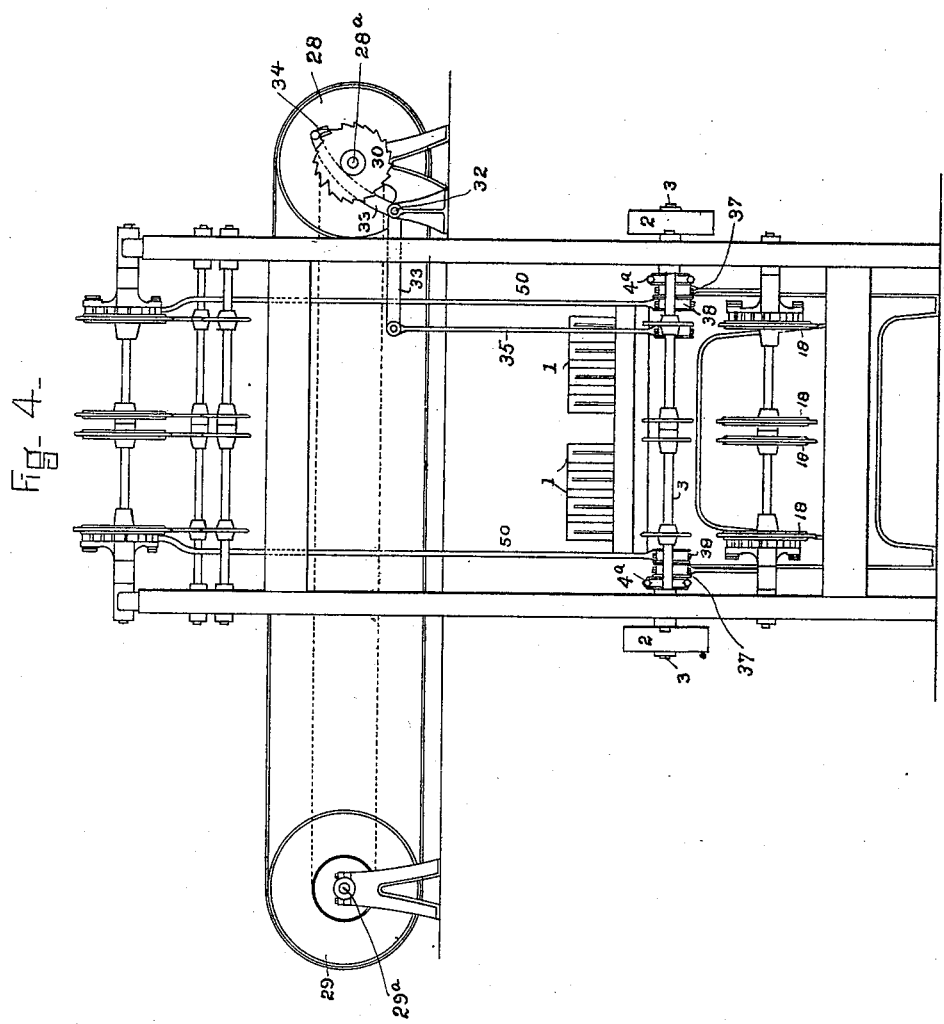
WITNESSES:
Howard L. Coburn,
Charles L. Ellis
INVENTOR:
Joseph Boulard
By Charles Carr
Atty.

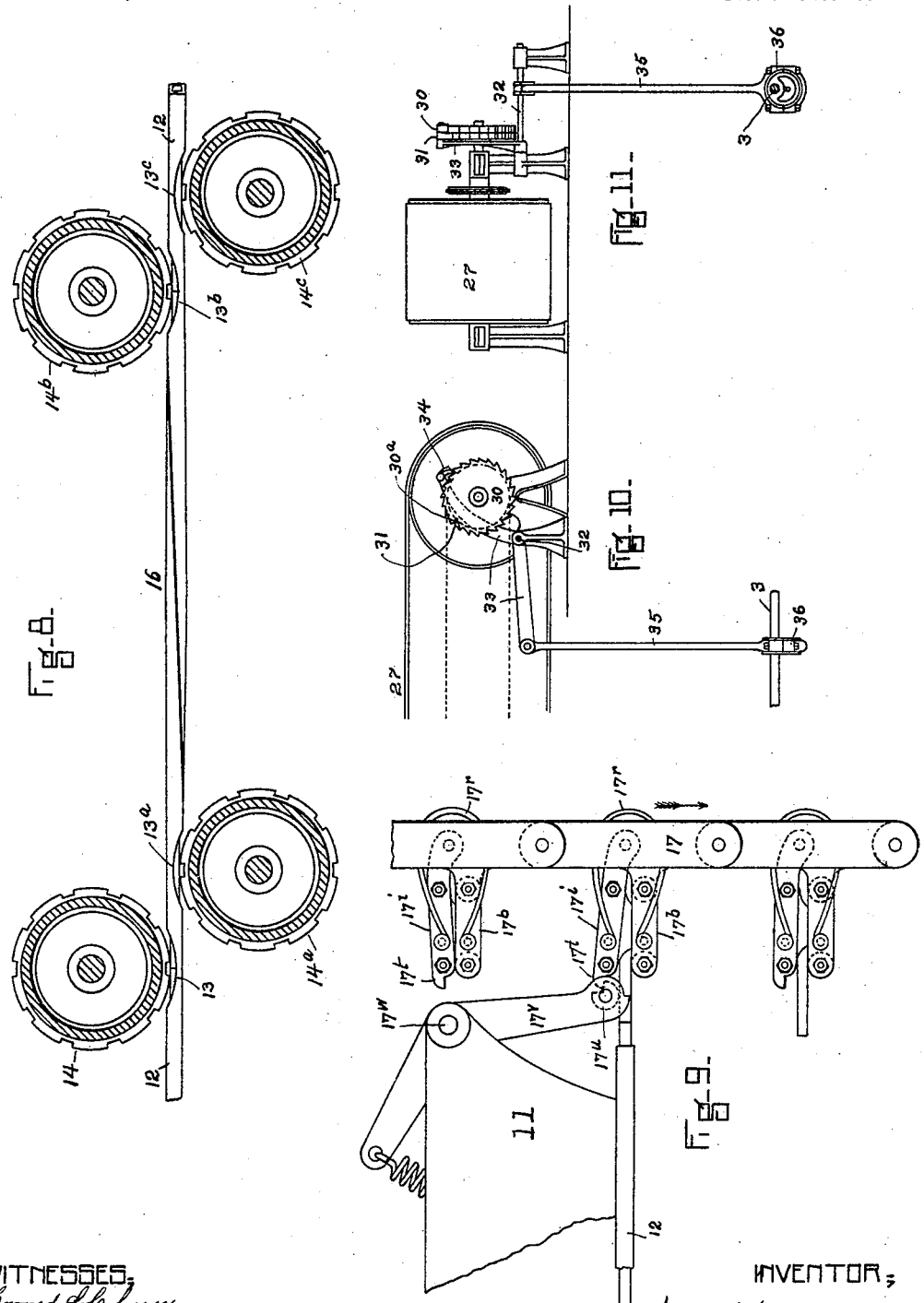

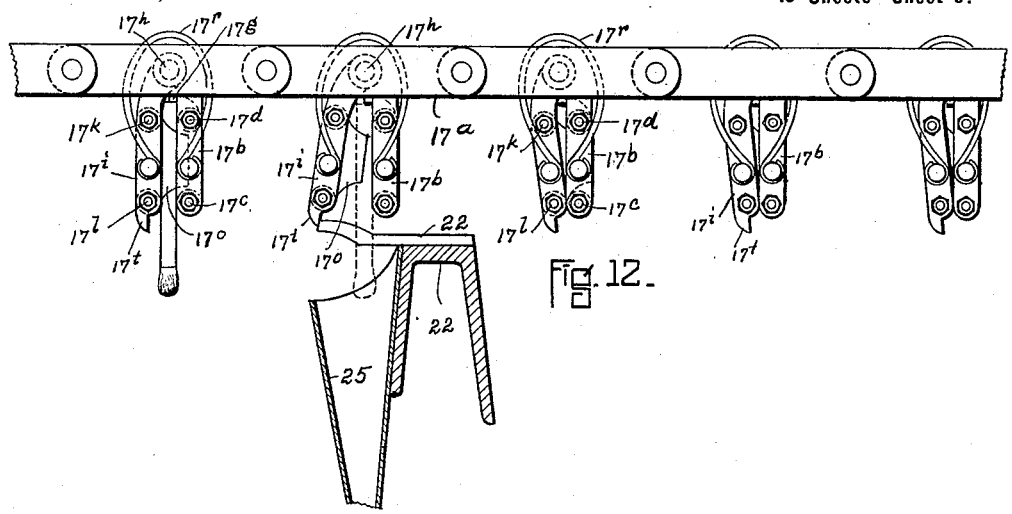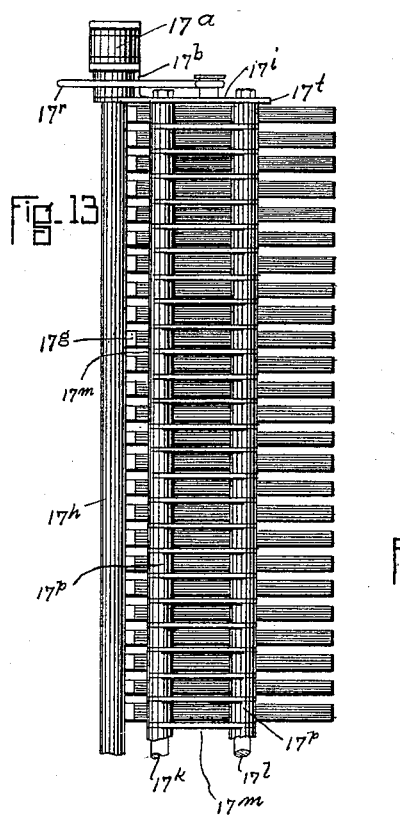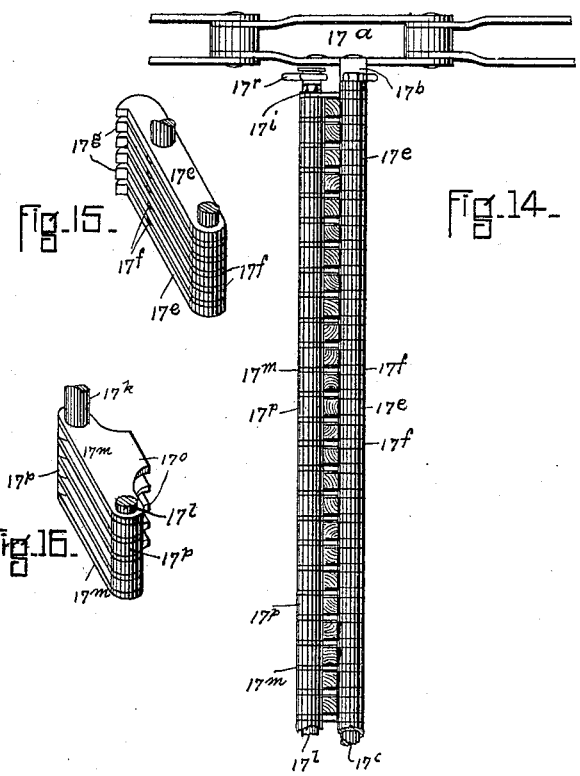

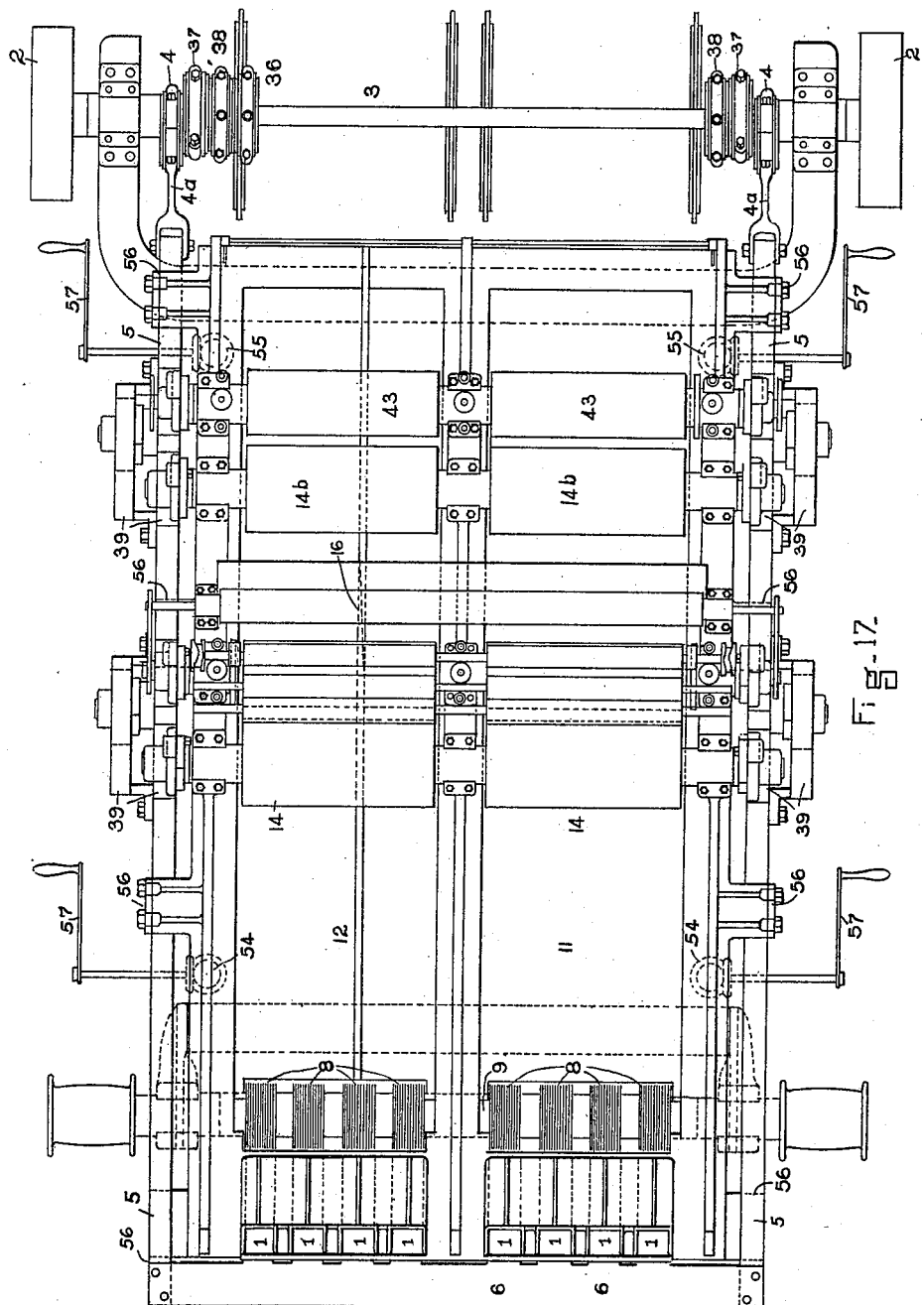

No. 614,925. Patented Nov. 29, 1898.
J. BOULARD.
MACHINE FOR MAKING MATCHES.
(Application filed May 14, 1896.)

(No Model.) 15 Sheets—Sheet 8.

WITNESSES,
Charles L. Ellis
Arthur H. Frost.

INVENTOR,
Joseph Boulard
By Charles Carr
atty.

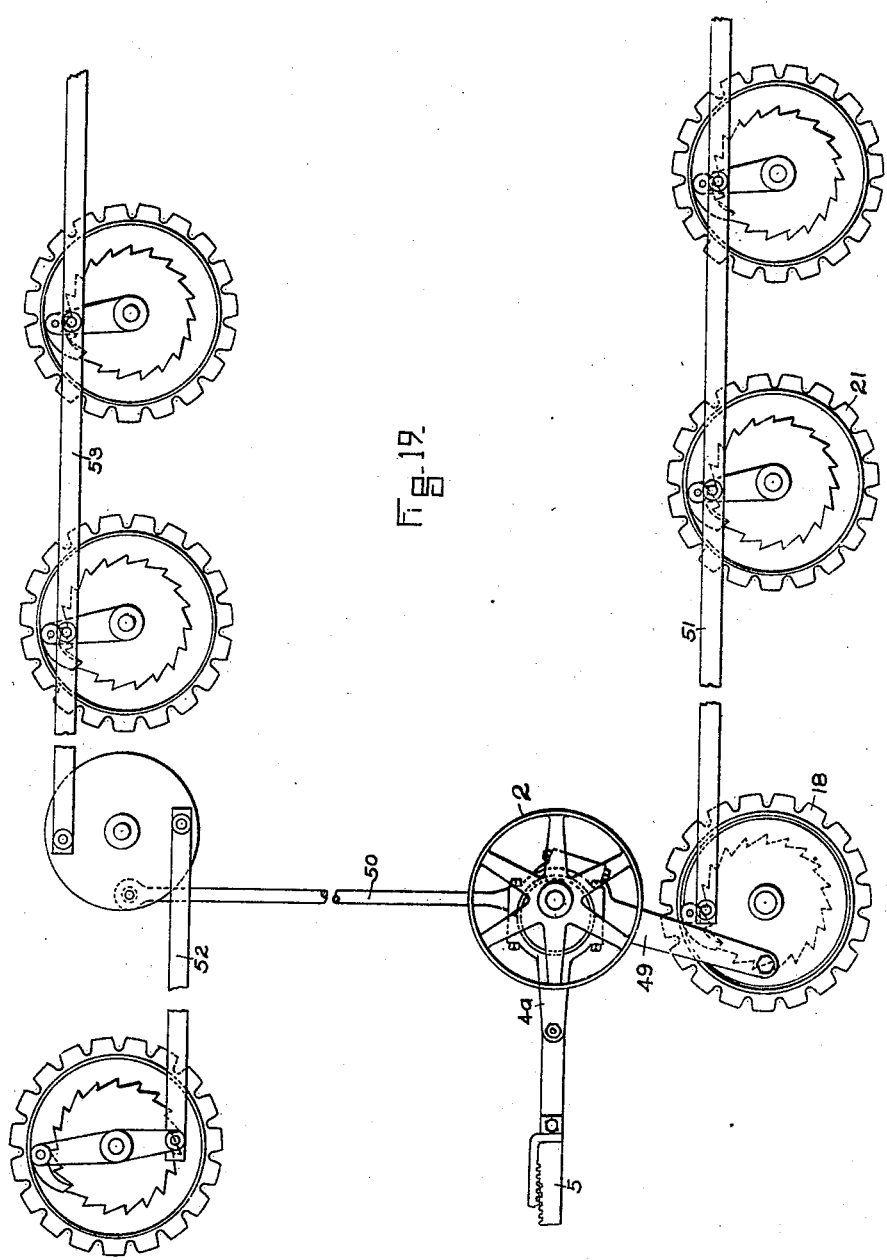

No. 614,925. Patented Nov. 29, 1898.
J. BOULARD.
MACHINE FOR MAKING MATCHES.
(Application filed May 14, 1896.)
(No Model.) 15 Sheets—Sheet 10.
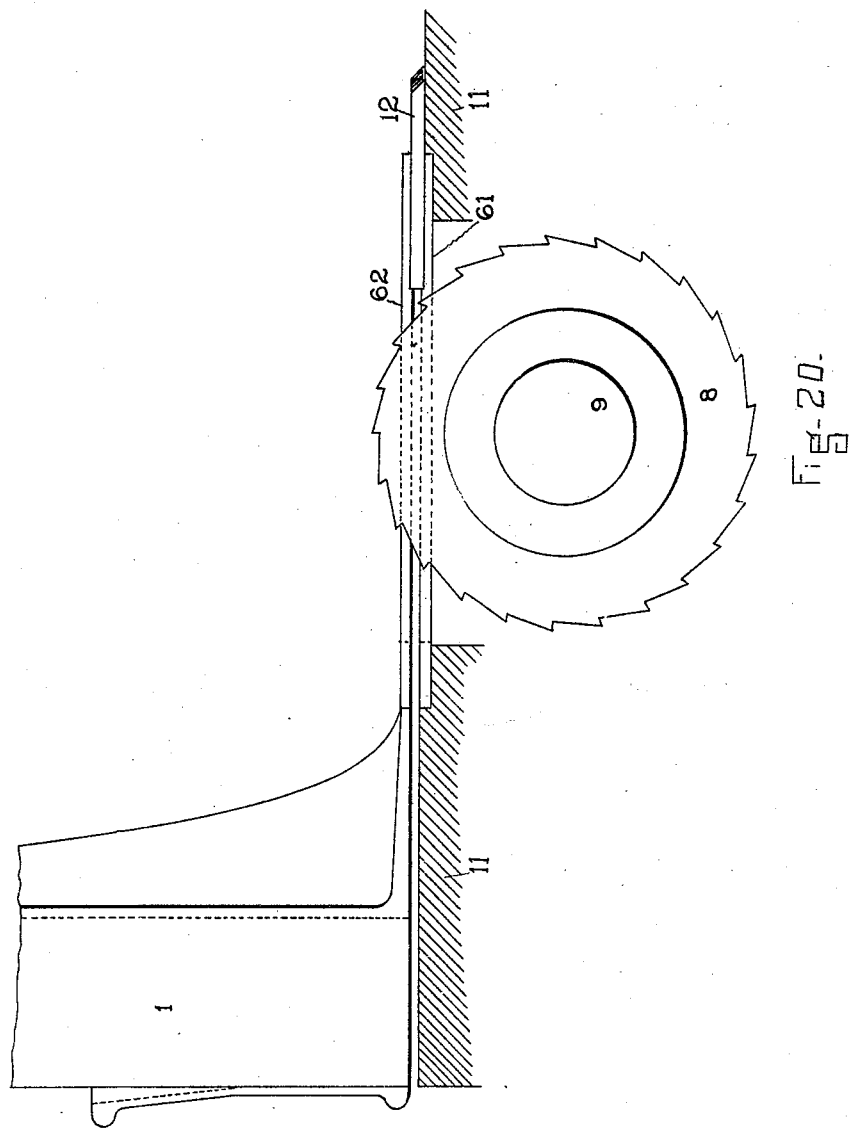
WITNESSES.
Charles C. Ellis.
Arthur H. Frost.
INVENTOR,
Joseph Boulard
By Charles Carr
atty No. 614,925. Patented Nov. 29, 1898.
J. BOULARD.
MACHINE FOR MAKING MATCHES.
(Application filed May 14, 1896.)
(No Model.) 15 Sheets—Sheet II.
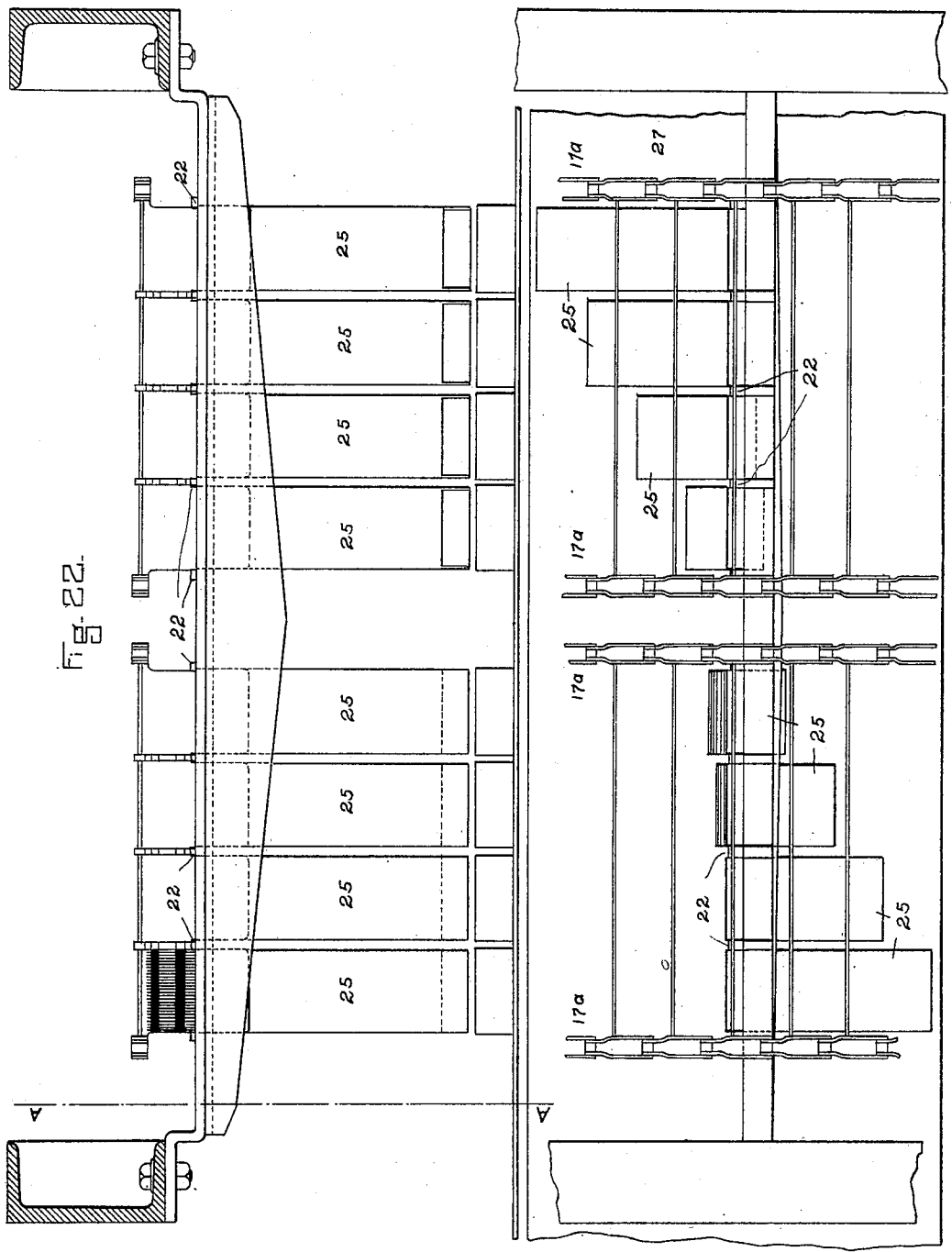

No. 614,925. Patented Nov. 29, 1898.
J. BOULARD.
MACHINE FOR MAKING MATCHES.
(Application filed May 14, 1896.)
(No Model.) 15 Sheets—Sheet 12.
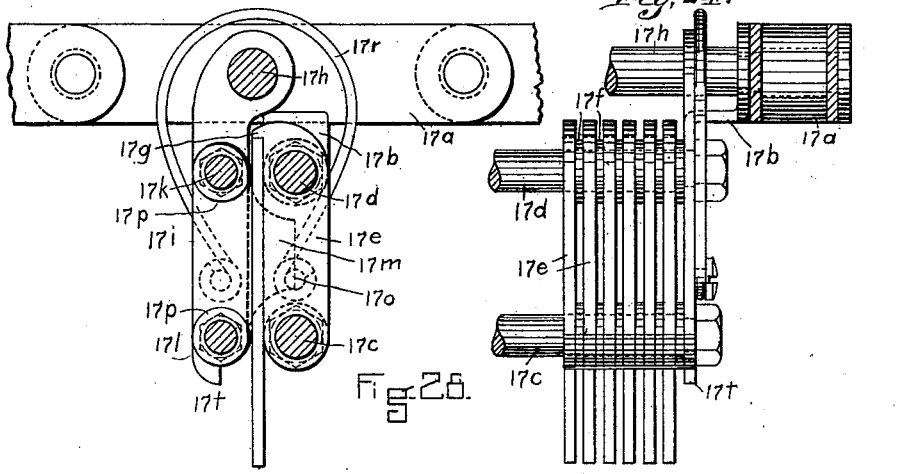
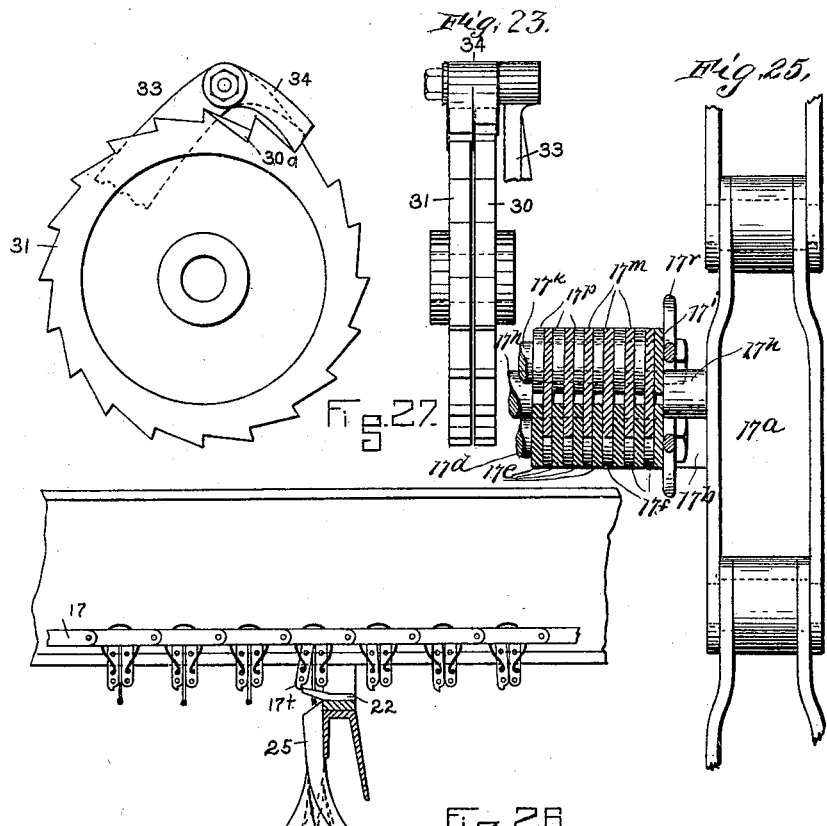
WITNESSES: INVENTOR, No. 614,925. Patented Nov. 29, 1898.
J. BOULARD.
MACHINE FOR MAKING MATCHES.
(Application filed May 14, 1896.)
(No Model.)
15 Sheets—Sheet 13.

WITNESSES.,
Charles L Ellis
Arthur C. Frost.

INVENTOR:
Joseph Boulard
By Charles Carr,
atty.

No. 614,925. Patented Nov. 29, 1898.
J. BOULARD.
MACHINE FOR MAKING MATCHES.
(Application filed May 14, 1896.)
(No Model.) 15 Sheets—Sheet 15.

WITNESSES: Charles L. Ellis. James W. Ripley.

INVENTOR: Joseph Boulard By Charles Carr, Atty.

UNITED STATES PATENT OFFICE.

JOSEPH BOULARD, OF BOSTON, MASSACHUSETTS, ASSIGNOR, BY MESNE ASSIGNMENTS, TO THE GLOBE MATCH COMPANY, OF PORTLAND, MAINE.

MACHINE FOR MAKING MATCHES.

SPECIFICATION forming part of Letters Patent No. 614,925, dated November 29, 1898.

Application filed May 14, 1896. Serial No. 591,739. (No model.)

*To all whom it may concern:*

Be it known that I, JOSEPH BOULARD, a citizen of the United States, residing in the city of Boston, county of Suffolk, and State of Massachusetts, have invented certain Improvements in Machines for Making and Printing Matches at a Single Operation, of which the following is a specification.

Under the requirement of the Office I submit the invention under two separate applications for patent. The following description therefore, including the drawings referred to, with the reference letters and figures thereon, constitutes a full and particular description of the match-making machine so far as it can well be separated from the printing mechanism and substitutes in part pending application Serial No. 591,739 and relates to the making of matches mainly, exclusive of the part that appertains to the printing of letters and devices thereon, which printing part, in the main, I reserve for a separate application—i. e., the second division.

The object I have in view in this invention is to produce a machine simple and practical in its construction, more positive, direct, and efficient in operation, and therefore more satisfactory in its results.

The nature of my present invention relates largely to improvements upon a similar invention of my own for making and printing matches, patented August 23, 1892, No. 481,522; and it consists in the construction, arrangement, and combination of the several parts, as hereinafter more fully set forth.

Figure 29:
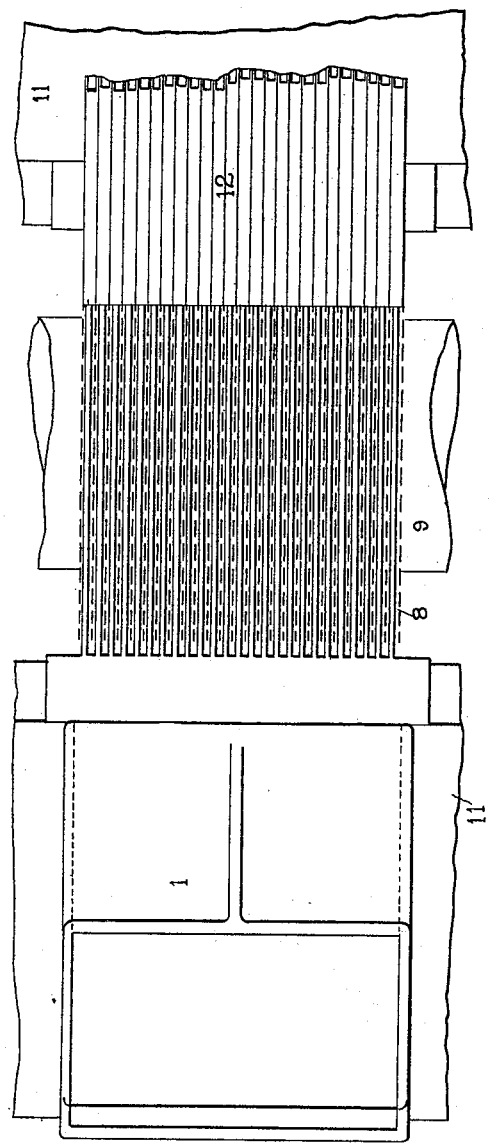
Figure 30:
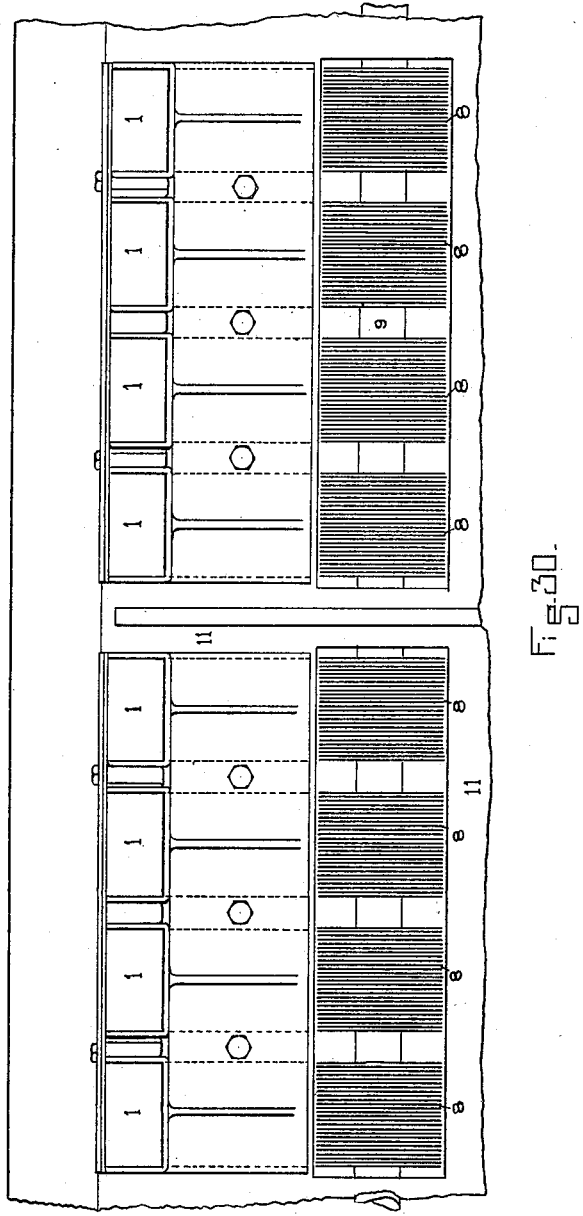
Figure 31:
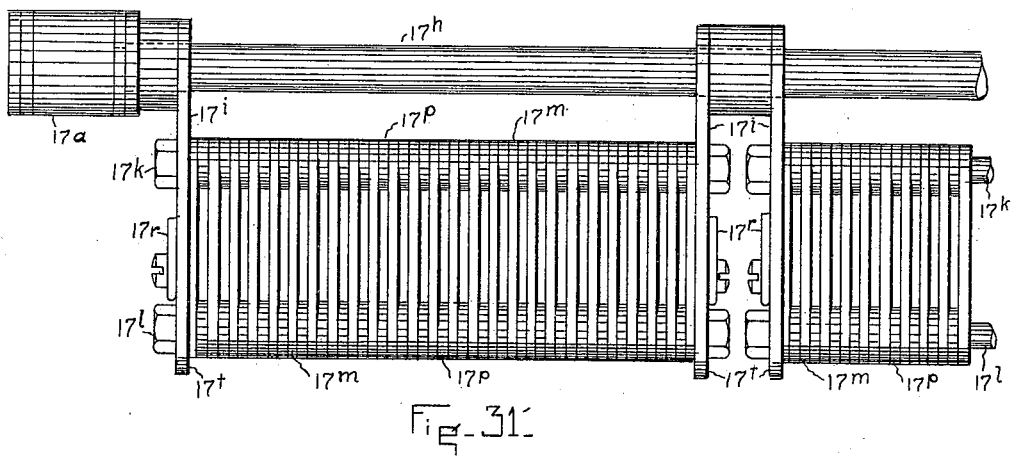
Figure 32:
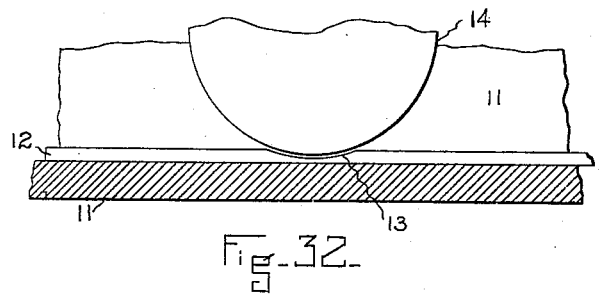
Figure 33:
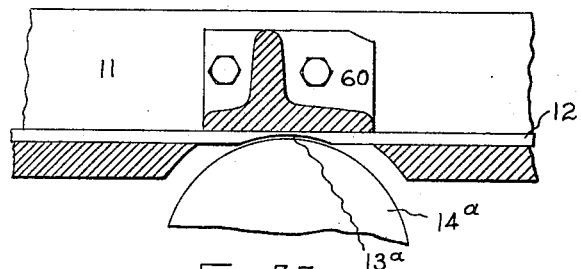

In the drawings, Figure 1 is a side elevation of the main part of the machinery, showing the splint-forming and printing mechanism. Fig. 2 is a similar and more comprehensive side elevation. Fig. 3 is a corresponding sectional elevation of a considerable part of the same. Fig. 4 is an end elevation, view point from the right in Figs. 1 and 2. Fig. 5 is a sectional elevation, view point at the left in Figs. 1, 2, 3, and 6, showing two individuals of the series of hoppers. Fig. 6 is a sectional elevation corresponding to Figs. 1, 2, and 3, showing one of the hoppers. Fig. 7 is a similar sectional elevation in which is shown one of the reciprocating side bars 5, which give motion to the hopper-bottoms 6 and when the printing mechanism is combined also to the segmental gears of the printing-rolls. Fig. 8 is a side sectional elevation showing one of the tubular guides 12 in its relation to the printing-rolls 14 $14^a$ $14^b$ $14^c$ when combined therewith. Fig. 9 is a side elevation corresponding to Figs. 1, 2, and 3, somewhat enlarged, to show the main conveyer 17 descending vertically and grasping the match-splints as they are ejected from the tubular guides 12. These match-splints are shown projecting from the tubular guides. Fig. 10 is an elevation, viewed from the right in Fig. 2, showing the transverse match-box conveyer 27 for carrying boxes to be filled. Fig. 11 is an end view of parts shown in Fig. 10. Fig. 12 is a side elevation of the main conveyer 17 at the point of delivery of completed matches to the transverse box-conveyer 27 through the chute 25 and corresponds to Figs. 1 and 2. Fig. 13 is an elevation, viewed from the right, of parts shown in Fig. 12. Fig. 14 is a view of parts in Fig. 13 and giving the end view of the match-splints in the grippers. Fig. 15 shows in a perspective view the fixed facets having stops for the ends of the match-splints. Fig. 16 is a similar view of the interlocking separators which enter between the gripping-facets and separate the individual match-splints in the grippers. Fig. 17 is a general plan, but too small to show the correct number of saws. (See Fig. 30.) Fig. 18 is a general elevation of the driving-shaft and connections—pulleys, sprocket-wheels, and shafts. Fig. 19 is an elevation of driving mechanism otherwise illustrated in Fig. 18. Fig. 20 is an elevation showing the dividers or saws 8 in their relation to the hopper 1 and the tubular guides 12 and also the saw-table 61 and top guides 62. Fig. 21 is a plan in which is shown the distributing-chutes for completed matches. Fig. 22 is an elevation of the same. Fig. 23 is a transverse elevation of the device for giving an intermittent movement to the box-conveyer, of which Fig. 27 is a side elevation. Fig. 24 is a transverse elevation of the conveyer 17, of which Fig. 28 is a side elevation. Fig. 25 is a cross-section on a line between points $17^c$ and $17^d$, Fig. 28, looking toward the sprocket-chain. Fig. 26 is an elevation illustrating the relations of main conveyer to chutes 25 and a train of boxes. Fig. 27 is an elevation of a device for giving an intermittent movement to the box-conveyer. Fig. 28 is a side elevation illustrating the construction of the conveyer 17. Fig. 29 is a plan in which is shown the relation of the tubular guides 12 to the saws or dividers, table 11, and hopper 1. Fig. 30 is a plan in which is shown the number and relation of saws 8 to hoppers. Fig. 31 is a sectional elevation illustrating the grouping of the match-grasping devices of the main conveyer. Fig. 32 is a sectional elevation showing the table-support 11 under the tubular guide 12 at the point of the pressure of the print-roller 14 through the scallop 13. Fig. 33 is a sectional elevation showing the bearer 60 opposed to the upward pressure of the print-roll 14ª upon the guide-tubes 12 through the scallop 13ª.

Like letters and figures of reference indicate the same or corresponding parts in all drawings.

The main frame A' for supporting the primary parts of the machine may be observed in Fig. 1. This frame A' carries prominently on the left, in Figs. 1, 2, and 3, the stationary hoppers 1 to receive the prepared match-splint blanks already formed to the proper length and thickness of a match and of a width adapted to be sawed into twenty-five match-splints. This assumed number may be varied in different machines. Any number of these hoppers may be used. Eight are shown in the drawings. In the base of this hopper (see Fig. 6) is arranged a driven platen or bottom 6, performing a double function, first, that of removing at each vibration one of the blanks by means of the shoulder of the raised portion 6ª, in conformity to which function it has the indispensable quality of reciprocating or vibrating to the limit of one match's length with just the necessary clearance to allow the next blank to freely take its place; second, this movement is also the driving force which carries the match-splint material through the tubular guide 12 to the main conveyer 17, where it arrives in final splint form. These platens or hopper-bottoms are moved by the side bars 5, (see Fig. 5,) to which they are connected. The reciprocating movement of the side bars is of the same length as the length of movement communicated to other operative parts of the machine. The frame A' also carries prominently on the right (see Fig. 1, also Figs. 2 and 3) the main shaft 3, on which are the eccentrics 4, (see Fig. 7,) which, through rods 4ª, give the required vibratory or reciprocating movement to the side rods 5. The platen 6, having this specific movement, in combination with the fixed hopper 1, is important, as related to many other features of the machine, for forming, printing, (when that is combined,) transferring, delivering, and packing matches.

Below the driving-shaft 3 is a shaft conveying sprockets 18 of the main conveyer 17. (See Figs. 1, 2, and 3.) This conveyer travels downward at the point of receiving the match-splints, passes around these sprocket-wheels to and around other sprocket-wheels on the right, carrying the match-splints at the beginning of their travel away from their point of delivery from the tubes 12 to the conveyer 17 and toward the dipping and drying section of the machine on the right of Fig. 2. Leaving this general outlining of the primary parts and returning to the hopper 1, which represents the beginning of the process effected by the agency of the machine, the operation is as follows: This hopper 1, eight of which are shown in this machine and which number may vary in different machines, is stationary, and a reciprocating bottom, which I will call a "platen" 6, is provided with a raised portion 6ª. (See Fig. 6.) This hopper receives the match-blanks, (see same figure,) which are of the required thickness and length for the proposed match and, in the case of the machine illustrated, are wide enough to make twenty-five matches, which number may be varied in different machines. This platen 6 receives from the side bars 5, (see Figs. 6 and 7,) to which it is connected, a movement forward and backward equal to the length of a match-blank plus clearance, its forward movement pushing a match-blank toward the dividers. Every time it recedes (to the left in Fig. 1) the pile of blanks in hopper 1 drops the thickness of a match-blank—i. e., from the raised portion 6ª to platen 6—either by its own weight or by any convenient agent for insuring the movement. At this recession of the platen 6 the blank, which has been pushed forward to the right, (see Figs. 1, 3, and 6,) is held from returning by friction or by pressure applied in any suitable and convenient manner, so that its space recently occupied in the hopper being made vacant receives, as before, the next blank in the hopper. This process being continued, a continuous line of blanks is pushed forward, the rear ones pushing those in advance in an intermittent movement suited to the length of the match plus clearance at each vibration. At a convenient remove from the hopper is located a gang of saws 8 (see Figs. 3 and 20) or other match-blank dividers, to and past which, through a convenient guiding-passage formed by the table 61 below and a similar guide-plate 62 above, are thus pushed the continuous train of match-blanks, becoming on emerging beyond the saws twenty-five (in case of the machine shown) match splints or bodies. Beyond the saws, farther to the right, in Figs. 20 and 29, are located in the track of the twenty-five match-splints twenty-five tubes 12, of metal, the internal section of which corresponds to the section of the matches, into and through which the moving blanks push the individual splints. These twenty-five tubes have a straight section, and in the straight or direct part is a scallop or opening exposing the match-splint as it passes for the action of a printing-roll above (see Fig. 8) and another opening exposing it to the action of a printing-roll below. Then beyond occurs a twist in the tubes in which the splint is turned gradually one-quarter of a full revolution. Then occurs another direct or straight section having a scallop or opening through which the splint is exposed to the action of a printing-roll above and another opening through which it is exposed to the action of a printing-roll below whenever the printing is combined herewith, which is usually the case. These rolls are marked, respectively, 14, 14$^a$, 14$^b$, and 14$^c$.

Referring to the general plan, Fig. 17, I have indicated at 12 one of the tubular guides through which the match-splints are passed from the eight gangs of saws 8 to the conveyer 17. This guide is twisted at 16 between the printing-roll scallops at 14 and 14$^b$. (In Fig. 29 the whole group of twenty-five tubes is indicated. There are two hundred in the eight groups.) The twist is fully illustrated in Figs. 3 and 8 and is marked 16 and has already been described. The tubes 12 are supported on the table 11 beneath the upper print-roll openings 13, Fig. 32, and have a bearer 60 over the lower-roll openings 13$^a$, Fig. 33, to reinforce them against the pressure from these rolls.

The twisted tubular guides 12 effect the turning of the match-splints, so that after two sides are exposed to an upper and lower roll the two remaining sides are exposed to other upper and lower rolls. These separate scalloped and twisted single tubes or guides 12 are peculiarly adapted to the purposes above described and are a most important feature in a match-printing and match-making machine.

As already noted, a suitable bearer 60 is provided above, while below the tubes, at such points as may receive the impressions from the printing-rolls, is the supporting-table 11, whereby the tubes are properly supported.

After the match-splints leave the printing-rolls they continue to be pushed forward intermittently, as described, and soon arrive at the conveyer 17, which moves at this point downward at right angles to the line of travel of the match-splints as they emerge from the tubes 12. (Observe Fig. 9, where part 17$^t$, which controls the swinging jaw, is detained until a sufficient opening of this jaw is effected, into which while at rest the match-splint is pushed at the moment of said opening and rest of this swinging jaw.) Then the next pulsation or movement of the conveyer carries it on downward and brings the next swinging jaw into position to grasp the succeeding row of match-splints. Thus proceeds continuously the pulsating train supplying the conveyer with match-splints. (See Fig. 12, showing one swinging jaw open.) From this point the conveyer, charged with its freight of match-splints, may be traced in Fig. 2 onward through the dipping and drying system here outlined, in which are located several heating-tanks, as B C, having steam-jackets or other temperature-controlling devices, in which is kept a suitable supply of the several compositions and baths used to perfect the igniting functions of the match. These are so arranged that the points of the match-splints are suitably immersed in them at such intervals as shall insure the necessary drying after the bath or several baths, after which the conveyer may be still traced with its freight by following the dotted lines shown in Fig. 2 to the extreme left at the top, where, passing around the sprocket-wheels, it begins its return travel, dropping its freight of matches at the chutes 25. (See also Fig. 12.) Arriving at the chutes 25 the detent 22, Fig. 12, or trip-operator causes again the opening of the swinging jaw, thus releasing the matches and allowing them to fall into the chutes 25. The present description and drawings represent eight of the described trains having groups of twenty-five matches each in width, as already implied. These chutes 25 are shown in Figs. 21 and 22. They diverge from the transverse line, (see Fig. 26,) at which the conveyer drops the matches into them in a regular gradation, bringing their exit of delivery ends each over one of eight trains or empty boxes waiting to be filled. These boxes are made to pass under these chutes 25 upon a transversely-moving secondary conveyer 27. (See Figs. 2, 4, 10, and 26.) This train of boxes also travels intermittently, the box-train resting under the chutes 25 a space of time sufficient to allow the dropping of the required number of groups of twenty-five matches in each box. If desirable, this mechanism may be mounted on the floors of a building other than that in which the forming and printing mechanism is located. To effect the required intermittent movement of the transverse box-conveyer 27 an eccentric on the main shaft 3, (see Figs. 4, 10, and 11,) through rod 35 and arms 33, gives movement to ratchet-wheels 30 and 31 and their shafts 28$^a$ and 29$^a$, drums 28 and 29, and conveyer 27. Thus a ratchet-wheel 30 on shaft 28$^a$ (see Fig. 4) is provided with uniform notches or teeth and is keyed on. A twin wheel 31 with one deeper notch is loose on the shaft beside wheel 30. (See Fig. 27.) A double-pointed pawl 34, Fig. 27, one point lower than the other, the low point riding on wheel 31, keeps the high point over wheel 30 from engaging until the lower point reaches and drops into a deeper notch 30$^a$ in wheel 31, when the high point, dropping a corresponding distance, engages with the teeth of wheel 30, driving it one tooth, and not until the loose wheel has been driven to the next deep notch and the low point has again dropped into this deep notch can wheel 30 be moved another tooth.

The loose wheel 31 may have more than one deep notch and so allow the wheel 30 to be oftener moved. Thus more or less teeth and more or less deep notches may be adopted, respectively, whereby the box-conveyer is made to rest the longer or shorter time required to deposit more or less groups of twenty-five matches in each box.

The construction of the main conveyer 17 is as follows, viz: There are four sprocket-chains $17^a$. (See Figs. 21, 22, and 14.) These four sprocket-chains are mounted on their sprocket-wheels, one of which is marked 18 in Fig. 1 and four of which are shown in Figs. 17 and 18 under the main shaft 3. This main conveyer 17 is in two parts or belts, (more may be used,) each part being composed of two sprocket-chains $17^a$, connected to each other as hereinafter described and each conveying four parallel longitudinal lines of match-splint groups, each group composed of twenty-five match-splints. (One complete group of match-splints is shown in Fig. 22.) Four of these groups of twenty-five match-splints are carried by each pair of sprocket-chains $17^a$ by means of gripping devices suspended from rods $17^c$, $17^d$, and $17^h$, which extend transversely between and are connected to the two sprocket-chains $17^a$. (See Fig. 12.) In Fig. 21 can be seen the four sprocket-chains $17^a$ and the connecting-rods, and in Fig. 22, at the left, is shown one of the groups of twenty-five match-splints occupying one of the four sections between the two sprocket-chains $17^a$ and which are held in one of the gripping devices suspended from the connecting-rod. The chains are made up of links and rivets on the plan of an ordinary machine-chain. Each inner link-plate of chain $17^a$ has a rigid projecting arm $17^b$. (See Figs. 23 and 24.) These links with rigid arms are connected to each other by the rods $17^c$ $17^d$ and also by the rod $17^h$. Rods $17^c$ and $17^d$ connect the arms and carry the gripping-facets $17^e$, having a hook or match-stop $17^g$ at the top, and the separator $17^f$. The four chains $17^a$ with connecting rods are shown in Fig. 21. The swinging arms $17^i$, Figs. 12 and 31, occur in pairs for each group of twenty-five matches. They are hinged upon the rods $17^h$, and each pair of swinging arms $17^i$ is connected by the rods $17^k$ and $17^l$. (See Fig. 31.) These rods carry the intermeshing separators $17^m$, Fig. 28, having the projecting portion $17^o$, alternated with the gripping bits or washers $17^p$, between which and the facets $17^e$ the matches are gripped. (See also Figs. 15 and 16.) The swinging jaw carrying the gripping-washers $17^p$, Fig. 31, is pressed upon the fixed jaw with its gripping-facets $17^e$ by the spring $17^r$.

The trip or finger $17^t$, Figs. 31, 28, and 12, is acted on by a suitable detent or trip-operator 22, placed in its track to loosen the grip at the required points, as previously noted, and to open it to receive the match-splints.

Having described my invention, what I claim, and desire to secure by Letters Patent, is as follows:

1. The match-conveyer as constructed, to in combination four chains $17^a$, the shafts and sprocket-wheels, the chains having the attached groups of fixed and movable jaws, the gripping-facets $17^e$, separators $17^f$ in the fixed jaws, the interlocking separators $17^m$, gripping-washers $17^p$ in the movable jaws, trip $17^t$ at the extremes of the groups, the trip-operator, pivotal rods $17^h$, fixed jaw connections $17^b$ to the chain-links, and the rod connections $17^c$ and $17^d$ for the parts; all arranged and coöperating, substantially as shown and described.

2. The combination of the general conveyer, its trip $17^t$, the trip-operator 22 and the sectional chutes 25, divergent in graduated order from a central supporting-bar to a series of boxes moved intermittently in a direction transverse to that of the general conveyer, whereby the matches are dropped in a somewhat vertically-inclined position, but, approximately, in the position required in the box when they fall from the opening of the inclined chutes, substantially as shown and described.

3. The combination of the general match-conveyer 27, the trip $17^t$ and trip-operator 22, the transversely and intermittently driven box-conveyer 27, and the coöperating individual chutes 25, their common central supporting-bar, said chutes diverging in graduated order from the group-lines of the main conveyer to the several box-trains upon the box-conveyer, substantially as shown and described.

4. The conveyer constructed with four parallel chains $17^a$ each having four series of plate-links, the inner series of links (between the chains) having fixed arms $17^b$ connected by rods $17^c$ and $17^d$ from one chain to the other, and said inner series also being connected by a rod $17^h$ on which are pivoted movable or swinging arms $17^i$, the fixed arms $17^b$ and rods $17^c$ and $17^d$ carrying a continuous series of gripping parts $17^e$, and the other rods $17^k$ and $17^l$ carrying sectional swinging groups, substantially as shown and described.

5. In a match-making machine the combination of the match-blank hoppers 1, match-blank-propelling side bars 5, the groups of saws 8, and the match-splint guide-plates 61 and 62, through which the saws operate, the separate, four-sided, scalloped splint-guide tubes 12, which are continuous from the saw-guide plates 61 and 62 to the main conveyer 17, and the conveyer 17, substantially as shown and described.

6. In a match-making machine the main conveyer as constructed with individual match-holding grippers having parallel fixed gripping-facets $17^e$ opposite to parallel swinging gripping-washers $17^p$, alternated with match-separators $17^m$, which have the projecting part $17^o$ passing between and past the lines of matches, the separating-washers $17^f$, the rigid perforated arms $17^b$, rods $17^d$ and $17^c$, in the fixed jaws, the rods $17^k$ and $17^l$, in the swinging jaws, the spring $17^r$, and the rods $17^h$ connecting the inner links of the chain, all arranged in a double right line throughout the entire breadth of the group-section for the purpose of receiving the groups of matches in a single row and depositing them in the same order, substantially as shown and described.

7. In a match-making machine the combination of an intermittently-moved main conveyer constructed with groups of parallel fixed gripping-facets $17^e$ opposed to groups of parallel swinging gripping-washers $17^p$ alternated with corresponding groups of match-separators $17^m$ which have the projecting parts $17^o$ passing between and past the grouped lines of matches, the separating-washers $17^f$, the rigid arms $17^b$ perforated to hold the rods $17^c$ and $17^d$ which support the fixed jaws, the rods $17^k$ and $17^l$ in the swinging jaw which is pivoted on the rods $17^h$ extending to and connecting the inner links of the chain, the match-splint stop $17^s$, the jaw-closing spring $17^r$, the jaw-opening trip $17^t$; the cross-bar and detent 22, the chutes 25, said chutes being supported by said cross-bar and diverging in graduated order from the group-lines of the main conveyer to the several box-trains upon the box-conveyer, and the intermittently-moved box-conveyer made to rest at the instant of contact of $17^t$ and detent 22 and consequent disengagement and dropping of the several groups of matches, substantially as shown and described.

8. In a match-machine conveyer, the combination of the two chains constructed with armed links $17^b$ as described, the connecting and gripper-supporting rods $17^c$, $17^d$, and $17^h$, the section or group rods $17^k$ and $17^l$ extending between and connecting the swinging arms $17^l$ on $17^h$ and the gripping parts, substantially as shown and described.

9. In a match-making machine, the straight cross-bar 22 having the series of chutes 25 diverging regularly and laterally each way from a central line to the several lines of travel of the several trains of boxes, in combination with an intermittent group-depositing mechanism and a box-carrier beneath, having a correspondingly intermittent movement, substantially as shown and described.

10. In a match-making machine, the combination of the main intermittently-moved conveyer constructed with downwardly-dependent and respectively rigid and movable gripping members, the trip and the movable members, the transverse straight bar 22 beneath bearing the series of divergent chutes, a stationary trip-operator, and the intermittently-moved box-conveyer beneath the chutes, made to rest at the instant of contact of trip and trip-operator and consequent disengagement and dropping of the groups of matches, substantially as shown and described.

11. In a match-making machine, a straight row of receiving-hoppers 25, the individuals of which correspond in position to the lines of movement of the several trains of match groups, and having their lower or delivery ends divergent to correspond to the lines of travel of several transversely-moving trains of receiving-boxes, in combination with the main and intermittently-moving general conveyer 17 and the intermittently-actuated and transversely-moving box-carrier 27, substantially as shown and described.

12. In combination with the main group-depositing conveyer 17, the transverse conveyer 27 of the several trains of boxes, the uniformly-spaced and the deep-toothed ratchet-wheels 30 and 31 having the upper and lower pointed pawl 34 and the intermutual coöperative impelling mechanism and the guide-chute mechanism, substantially as shown and described.

13. In a match-making machine the combination of the following-named parts, viz: the frame A' having a reciprocating longitudinal bar mounted on each side, a series of hoppers having propelling-bottoms connected to said side bars, a series of match-splint dividers next to the propelling-bottoms, succeeding single-tube guides having pairs of printing-roll open scallops, said single-tube closed guides, (i. e. constructed with sides, bottom and top,) being continuous from the dividers to the main conveyer, the main conveyer and the eccentric driving mechanism, substantially as shown and described.

14. In a match-making machine, for the purpose of forcing, dividing, timing and conducting the match material in proper positions to the main conveyer, the combination of the described hopper-bottom and reciprocating mechanism, the dividers and the single-tube guides, scalloped and twisted, substantially as shown and described.

15. In a match-making machine, to be connected with a printing apparatus, the combination of the main conveyer constructed to carry groups of match-splints, correspondingly-arranged groups of single-tube splint-guides, made continuous from the match-blank dividers to said conveyer, and constructed with pairs of open print-roll-admitting scallops, and having intervening straight and twisted closed sections, the side reciprocating bars, connected match-blank-driving hopper-bottoms, and succeeding dividers all arranged and coöperating substantially as shown and described.

16. In a match-making machine, the combination of the following coöperative parts, viz: the single-tube separate guides of match-shaped section having consecutively, direct, scalloped, twisted, and direct scalloped sections, stationary hoppers whose bottoms are match-blank-propelling platens, reciprocating side bars to which these are attached, the blank dividers and racks upon said side bars for simultaneously operating any printing mechanism to be connected therewith, substantially as and for the purpose set forth.

17. In a match-making machine the combination of the gangs of blank dividers or saws, single-tube guides made continuous from dividers to main conveyer, constructed with four sides, but having a series of open scallops both in their top and in their bottom for admitting printing-rolls, the match-blank-propelling hopper-bottoms, preceding the dividers, the side bars 5 for moving the said hopper-bottoms, and the connecting-rods 4ª, shaft 3, pulley 2, and coöperative parts, substantially as shown and described.

18. The combination of the eccentric-propelled reciprocating side bars having attached racks for operating upper and lower printing-rolls, the attached impelling hopper-bottoms which push match-splint blanks to the dividers and push the splints beyond the match-dividers, the single-tube guides complete with top bottom and sides, and openings to admit printing-rolls to the match-splints, and having alternating straight and twisted sections and extending to the main conveyer, said conveyer, supports and operating mechanism, substantially as shown and described.

19. In a match-machine, the combination of a match-conveyer and a match-box conveyer moving at right angles to each other in different planes, and a match-chute having a match-receiving opening adapted to receive a group of matches transversely arranged with reference to the line of movement of the match-conveyer, and a delivery-opening, substantially parallel to the line of movement of the match-box conveyer, substantially as described.

20. The independent continuous single-tube guides (i. e. constructed complete with top, bottom and sides in one) extending from the dividers of match-blanks to the main conveyer, and having scalloped direct sections resting against the supporting-table 11, and bearer 60 and an intermediate twisted section, whereby provision is made for combination with a printing mechanism, the dividers and impelling operative mechanism, substantially as shown and described.

21. In a match-making machine, the separate single-tube guides of match-shaped section, continuous from the dividers or saws to the main conveyer, constructed with open, scalloped, straight and intermediate twisted sections, substantially as shown and described.

JOSEPH BOULARD.

Witnesses:
F. M. HOOPER,
CHARLES CARR.